July 22, 1958　　　H. F. HOBBS　　　2,844,043
POWER TRANSMISSION APPARATUS
Filed April 2, 1956　　　2 Sheets-Sheet 1

INVENTOR
HOWARD FREDERICK HOBBS
By Young, Emery & Thompson
ATTORNEYS

July 22, 1958  H. F. HOBBS  2,844,043
POWER TRANSMISSION APPARATUS

Filed April 2, 1956  2 Sheets-Sheet 2

INVENTOR
HOWARD FREDERICK HOBBS
BY Young, Emery & Thompson
ATTORNEYS

United States Patent Office 2,844,043
Patented July 22, 1958

2,844,043

POWER TRANSMISSION APPARATUS

Howard F. Hobbs, Leamington Spa, England, assignor to Hobbs Transmission Limited, Leamington Spa, England Application April 2, 1956, Serial No. 575,589

Claims priority, application Great Britain April 5, 1955

3 Claims. (Cl. 74—330)

This invention relates to power transmission apparatus especially adapted for driving machinery such as wire drawing machines and cigarette making machines from a low speed up to maximum speed.

According to the invention the transmission apparatus comprises at least two clutches, means for connecting one or the other of the clutches alternatively to the load through driving means of different ratio, and means whereby the high ratio clutch is engageable with light engaging load to permit slipping for low speed driving, and whereby the engaging load can be gradually increased to full engagement and a change then made to driving through the low ratio clutch.

The clutches may conveniently be constructed substantially as described in the specifications of British Patents Nos. 596,908, 637,251, 628,499, 637,269, 644,173, 707,313, 707,664 and 720,022.

The invention will now be further described by way of example with reference to the accompanying diagrammatic drawings wherein.

Figure 1:
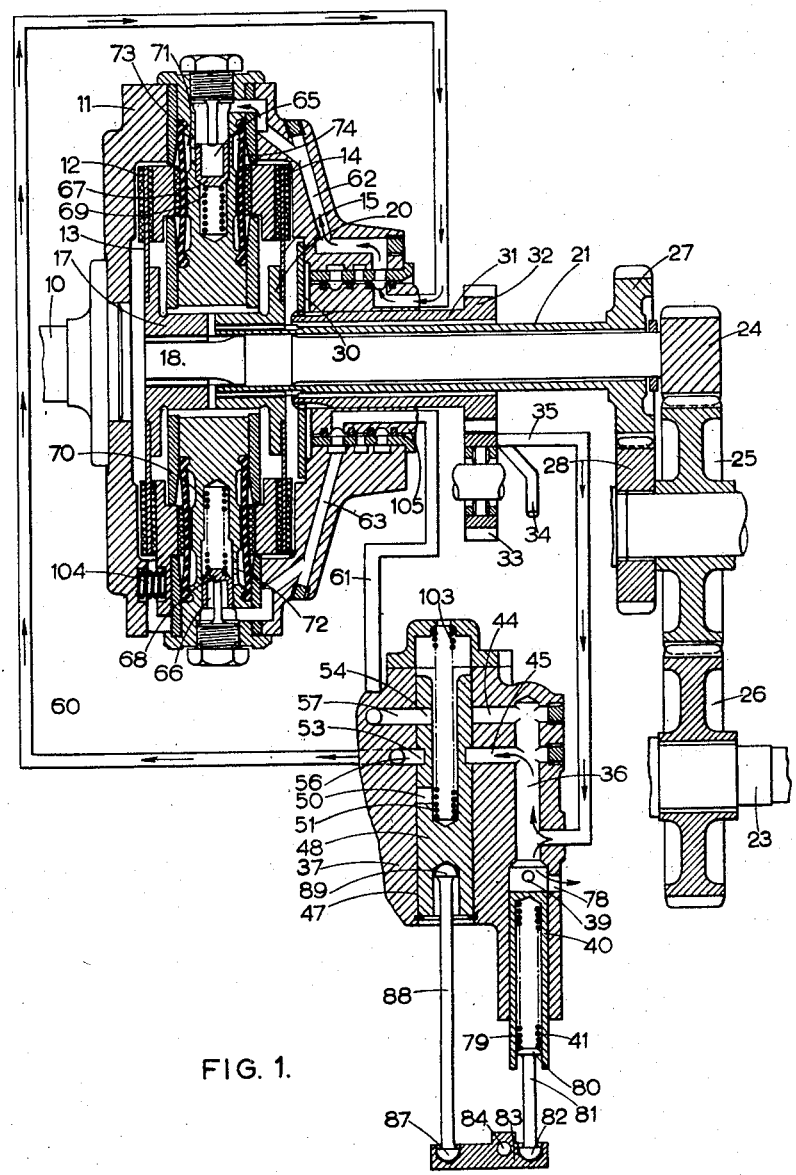
Figure 1 is a sectional view of a transmission apparatus made in accordance with the invention.

The apparatus has a power input shaft 10 which drives a housing 11 that carries a set of friction rings shown generally at 12 adapted to engage a spinner plate 13, and a set of friction rings 14 adapted to engage another spinner plate 15. The spinner plate 13 is carried by a boss 17 splined to a central shaft 18 and the spinner plate 15 is carried by a boss 20 splined on a sleeve 21 that surrounds the shaft 18. Shaft 18 drives an output shaft 23 through high ratio gears 24, 25, 26 and the sleeve 21 drives the output shaft 23 through low ratio gears 27, 28, 25, 26.

The housing 11 carries a toothed annulus 30 that drives an oil pump 33 through a sleeve 31 and pinion 32. The pump has an inlet 34 and an outlet 35. The outlet 35 is connected to an inlet channel 36 in a selector valve housing 37 which may form part of the pump housing and carry the journal 105. The channel 36 is in communication with a lubrication opening 39 (for lubricating the gears) and to a bore 40 containing a relief valve piston 41. The channel 36 also communicates by ducts 44, 45, with a bore 47 containing a selector valve member 48. The member 48 has exhaust ports 50, 54 in communication with a central exhaust channel 51, and an annular feed groove 53. The valve housing has ducts 56, 57 communicating with the bore 47 and connected by drillings 60, 61 respectively and ducts 62, 63 in the rotary housing 11 with bores 65, 66 in the housing which contain valve members 67, 68 urged outwardly by springs 69, 70 to close ports 71, 72 leading to spaces behind flexible rings 73, 74 through which the friction rings 12, 14 are engaged with the spinner plates 13, 15.

Figure 4:
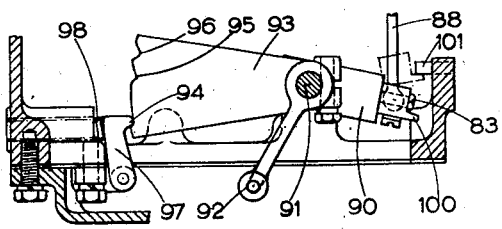
Figure 4 is a view of a detent device for use with the apparatus of Figures 1 to 3.

The bore 40 has an exhaust opening 78 which can be closed by the piston 41 and the latter is urged towards closing position by a spring 79 within the piston 41. The spring is compressed by a plunger 80 carried by a rod 81 that has a ball end 82 held in a recess on one side of a beam 83 that is carried by a pivot pin 84. On the other side of the pivot pin 84 the beam carries the ball end 87 of a rod 88 which has a ball end 89 engaged in a recess in the selector valve member 48. The rods 81, 88 are parallel to each other and to the direction of movement (approximately) of the pin 84 and transverse to the axis of this pin. The pin is carried by an arm 90 (Figure 4) which is mounted radially on a control shaft 91 which the operator can move by means of a lever 92. The shaft 91 also carries an arm 93 which is in the form of a detent blade and has detent notches 94, 95, 96 therein engageable by a detent pawl 97 under the pressure of a spring 98. The notch 94 limits movement of the shaft 91 in one direction and a stop 100 on the arm 90 engages a stop pin 101 to limit movement of the shaft 91 in the opposite direction.

The pressure in the pump liquid pressure system is dependent upon the load on the relief valve spring 79.

The selector valve is shown in Figure 1 in the position in which both clutches are disengaged. The pin 84 is held in this position by the detent pawl 97 engaged with the detent notch 94. In this position the duct 44 is closed and the duct 45 is connected by the groove 53, drilling 60, etc., with the high ratio clutch 12. The liquid pressure is however too low to engage the clutch but is sufficient to press back the valve member 67 and fill the space behind the flexible ring 73.

Figure 2:
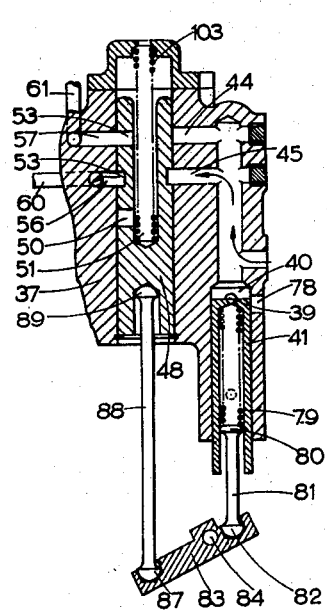
Figures 2 and 3 show parts of Figure 1 in different operational positions.
Figure 3:
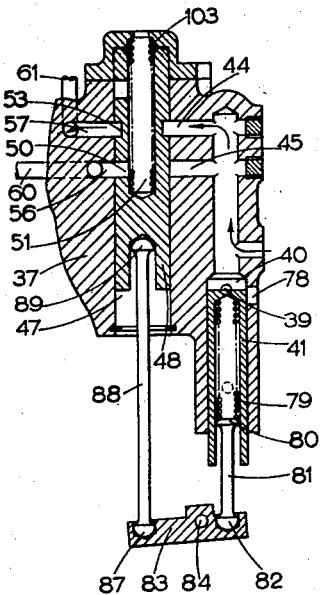

So as not to cause erratic action and to provide a steady initial speed, the disengaging springs (of which one is shown at 104) which act on the pressure plates of the clutches may be of sufficient strength to overcome the given minimum oil pressure. A clutch may therefore be filled with oil at the minimum pressure but remain completely free until some slight increase in pressure is brought about by movement of the control lever 92. Movement of the lever 92 will compress the relief valve spring 79 thereby gradually raising the fluid pressure and permitting more or less degree of engagement or slip of the clutch 12 as required. The output shaft may be "inched" such as for loading a machine, or may be allowed to rotate at a steady but slow speed through a slipping clutch. When the lever has been moved to the position giving maximum pressure, shown in Figure 2, the high ratio clutch will be completely engaged, and no slip will take place. The pawl 97 then engages notch 95 and holds the parts in the fully engaged high ratio position. Final movement of the lever 92 causes the rod 88 to move the selector valve member 48 against the action of the spring 103 to the position shown in Figure 3 in which the clutch 12 is disengaged by exhausting its fluid pressure through 60, 56, 50, 51 and clutch 14 is engaged by fluid pressure through 44, 53, 57, 61, 63, maximum fluid pressure being maintained in this position since the relief valve spring 79 remains compressed. The parts are held in this position by engagement of the pawl 97 in the notch 96.

I claim:

1. A power transmission apparatus comprising an input shaft, at least two hydraulically actuated clutches connected to the input shaft, an output shaft, gearing connecting the clutches to the output shaft by two different transmission ratios respectively, pump means for supplying fluid pressure for engaging the clutches, selector valve means movable to two selected positions alternatively and directing the fluid from the pump to one of the clutches in one selected position and to the other clutch in the other selected position, a relief valve for controlling the hydraulic pressure supplied by the pump to said clutches, spring means urging said relief valve towards valve closing position, a control member operable by the operator, means for conveying initial movement of the control member to said spring means to compress the latter and thereby increase the hydraulic pressure from substantially no pressure up to cltuch engagement pressure, and means which conveys later movement of the control member to the selector valve to cause the latter to move from one selected position to the other.

2. A power transmission apparatus comprising an input shaft, two hydraulically actuated clutches connected to the input shaft, an output shaft, gearing connecting the clutches to the output shaft by two different transmission ratios respectively, pump means for supplying fluid pressure for engaging the clutches, a selector valve piston operable in a bore having ports connected with the pump output and with both clutches and movable to two selected positions alternatively and directing the fluid from the pump to one of the clutches in one selected position and to the other clutch in the other selected position, a relief valve piston for controlling the hydraulic pressure supplied by the pump to said clutches, first spring means urging the selector valve piston to one selected position, second spring means urging said relief valve piston towards valve closing position, a pivotally movable beam connected to both said pistons, means for moving the beam towards said pistons against the action of both said spring means, whereby initial movement of the beam towards said pistons compresses the second spring means and thereby increase the hydraulic pressure from substantially no pressure up to clutch engagement pressure and continued movement of the beam moves the selector valve piston to cause the latter to move from one selected position to the other.

3. An apparatus as claimed in claim 2 having a pivot pin on which the beam is pivotally mounted and rods which operatively connect the beam to the valve pistons respectively on opposite sides of the pivot pin, said rods being parallel to each other and to the direction of movement of the pin and transverse to the axis of the pin.

References Cited in the file of this patent

UNITED STATES PATENTS

| | | |
|---|---|---|
| 2,320,960 | Wheaton | June 1, 1943 |
| 2,548,756 | Winther | Apr. 10, 1951 |
| 2,582,220 | Beckwith | Jan. 15, 1952 |